Inventor
Bruce Wells
by
Attorney

UNITED STATES PATENT OFFICE 2,571,397

METHOD OF PRODUCING PRINTING PLATES

Bruce Wells, Portland, Oreg.; Marjorie Stewart Wells, executrix of said Bruce Wells, deceased Application February 12, 1946, Serial No. 647,158

8 Claims. (Cl. 18—58)

My invention relates to the manufacture of a plastic plate which may be made directly from a wax mold without requiring that a matrix or intaglio mold be made. My invention is particularly directed to an improved method for producing such mold from one of the synthetic resins which is in liquid form but which sets and hardens at atmospheric pressures and temperatures.

I am aware that plastic plates have been made heretofore in the printing art and said plates have been used for reproducing printed, ruled and other types of forms. It is common practice to make up a wax mold by impression or by engraving methods common to methods used in the electro-type and electro-printing arts. In said arts it has been deemed essential to produce a strong matrix capable of withstanding substantial pressure. Then one of the synthetic resins has been used to fill in said matrix and said synthetic materials are pressed tightly into the matrix so that all of the detail is picked up, and the plate thus formed is subjected to elevated temperatures to set the material and to produce said plate. In the manufacture of ruled forms, for example, the expense of producing said plate in this manner exceeds that of setting up said form mechanically and thus said plastic printing plates have not enjoyed a wide vogue because of said increased expense.

As far as I am aware, the art has not deemed it possible to make printing elements of synthetic resins directly from wax impressions because it was deemed necessary:

1. To provide a matrix which had sufficient mechanical strength to withstand said operating pressures.

2. It was essential to heat said synthetic material and the heat involved was substantially higher than the melting temperature of the wax.

3. Wax is fragile and easily marked or distorted. With common practices said wax would be so affected that it would not accurately depict the form to be reproduced.

4. If a resin in liquid form is used it is so viscous that it entraps or entrains air bubbles which lodge against the surface of the form to be reproduced and these air bubbles produce defects in the printing plate produced therefrom.

I have been able to overcome said difficulties in my improved method by forming such wax impressions by usual engravers' methods. I then form a wall about said wax engraving and flood the surface thereof with some material which crowds out the air bubbles which attach themselves to the wax engraving and reduce the surface tension thereon so that when a liquid plastic is poured thereover, said plastic (being of higher specific gravity) moves under and displaces said material and fills in all of the voids on the wax engraving and thus faithfully reproduces the detail thereof. I select a material which does not shrink appreciably and one which bonds more readily to the bounding walls than it does to the wax engraving. Thus, the lateral dimensions of said plate are maintained and there is no appreciable shrinkage over the printing surface.

I preferably form such printing plate of less thickness than the type height of a plate and supplement said printing plate with a backing made either of a plastic material or of wood or other material. If a plastic backing material is used I pour it over the synthetic resin at such time when the latter has set up so that it will not be disturbed by the formation of said backing but yet while it is "packy" and thus produces an effective bond between the printing plate and said backing. I also utilize the factor of greater affinity of said synthetic material for the bounding member to produce a saucerlike back on the printing plate to hold and retain the backing material in place and to give it greater mechanical strength.

The details of my invention and the manner in which my improved method is practiced are hereinafter described with reference to the accompanying drawings in which.

Figure 4:
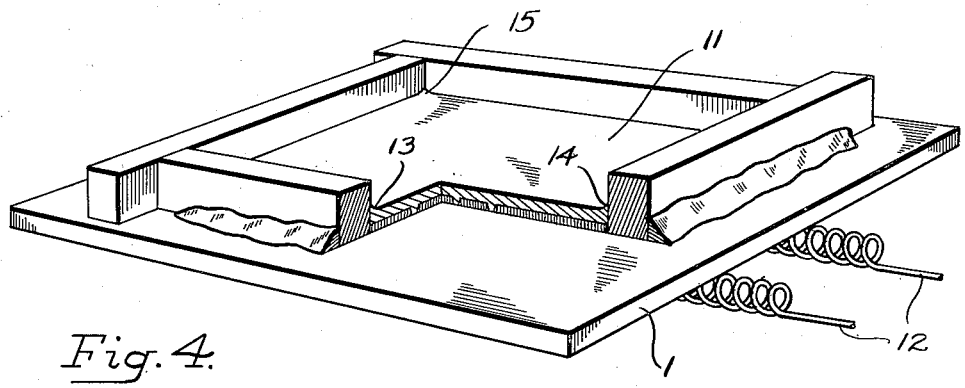
Figure 5:
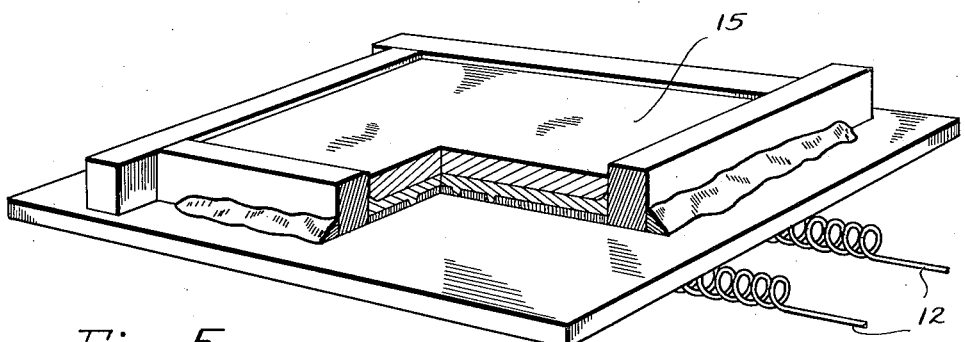
Figure 6:
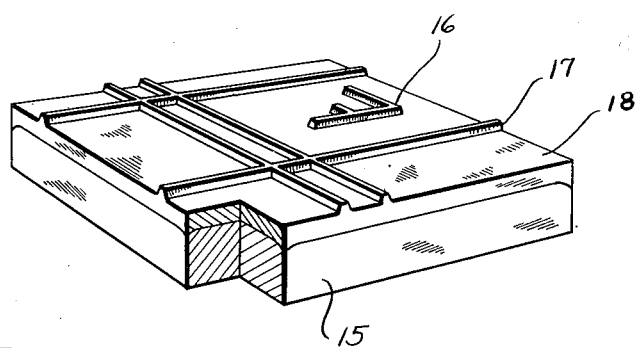

Fig. 4 illustrates the manner in which said synthetic material flows into the apertures in said wax engraving to form a reverse replica thereof, said view illustrates the manner in which said synthetic material tends to form virtually a fillet at the point of joinder of said printing plate with the bounding members to hold the printing plate thus formed against lateral shrinkage and distortion, said figure also shows heating elements which are provided within a limited range to accelerate the setting and hardening of said plastic material without melting or deforming the wax engraving;

Fig. 5 is a similar view of said printing plate after a backing portion thereof has been flowed in place and illustrates the laminated structure of printing surface and backing plate; and Fig. 6 is a similar perspective view of a printing element thus made comprising a printing plate made of synthetic material with the backing plate of some other material secured thereto, said printing element being of eventual type height.

Figure 1:
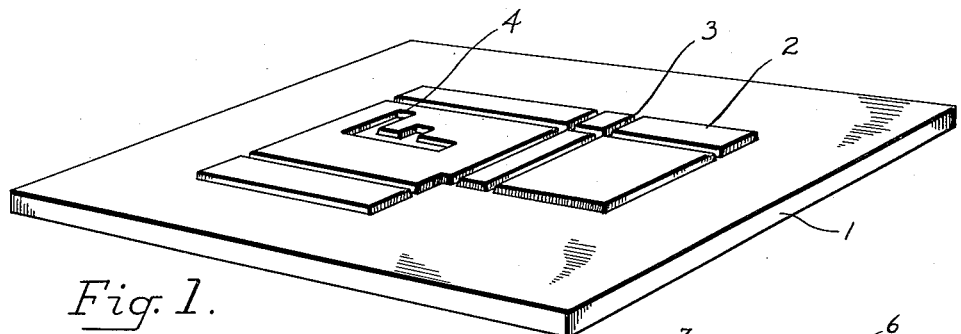
Fig. 1 is a perspective view of a wax engraving adhesively secured to a plane mounting plate, portions of the engraving being shown broken away to disclose details thereof.

Referring first to Fig. 1:

I preferably use a smooth surfaced horizontally arranged supporting plate 1, which should have a smooth, plane surface, and be sufficiently hard to prevent scratching by any scribing instrument in producing a wax engraving thereon. Said plate preferably is of plate glass because it has these desirable characteristics. I spread upon the upper surface of said plate a bed of wax which should be of uniform thickness. I have found that when the plate 1, and the wax itself, are heated that it imparts to the wax proper qualities which permit it to be carved or scribed. Any good engravers' wax is satisfactory or any other plastic which possesses sufficient body to permit it to take and hold sharp clean lines. Thus, in my claims, I use the term "wax-like" to define such an engraver's wax or such an easily scribable plastic of sufficient body to retain sharp clean lines. The thickness of the wax placed on the smooth surface may be varied to suit the type of end-product desired, but this is generally determined by the depth of the impression to be formed therein. I preferably form said bed 2 of wax approximately $\frac{1}{16}$ of an inch thick. This dimension is not critical but it corresponds more or less generally to the depth of the beard or neck of a type face. Said bed may be scribed by any type of instrument desired to produce the desired figurations and impressions therein. In forming the lines 3 therein I preferably utilize a standard scribing machine and cut said lines entirely through the bed of wax to the upper or exposed face of the plate 1. Impressions 4 formed by type also are impressed to this depth, thus, said lines and said type depressions will be of uniform height and will lie in a plane. I do not deem it necessary, however, to form said lines 3 or said type impressions 4 to the upper surface of said plate if some other means is utilized for maintaining a uniform depth to said lines and impressions so that they will lie in a plane.

When all desired impressions and configurations have been formed in said wax bed 2 all extraneous wax is removed from the flat surface and it is formed into a rectangular figure. This is the form of wax engraving shown in Fig. 1, and to this point substantially standard practices have been followed.

Figure 2:
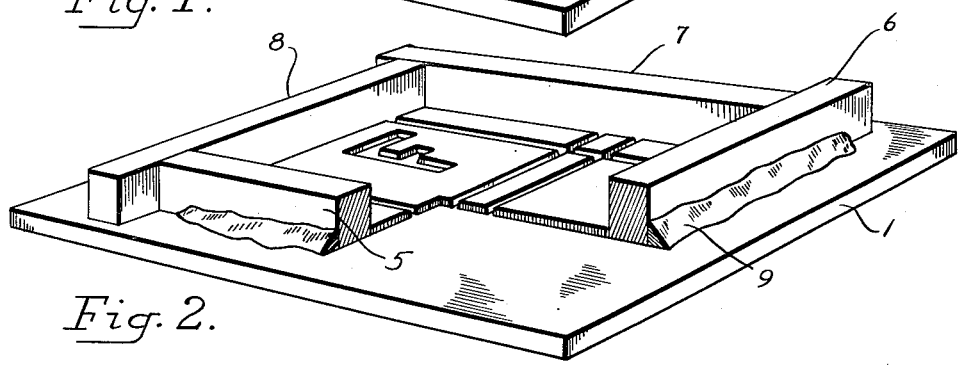
Fig. 2 is a similar but progressive illustration of the steps of my method in which bounding members have been arranged about the periphery of the wax engraving and have been adhesively secured to the supporting plate so that said bounding members will not be inadvertently displaced laterally in the performance of the succeeding steps of said method.

I form a bounding wall of members 5, 6, 7 and 8 which may extend beyond the margins of the rectangular bed of wax but should be in close abutment with said other members as is illustrated in Fig. 2. Said wall members preferably are of brass or other material which will the plastics used. Said members also should be so massive that they will not easily be displaced laterally by any pressures generated within their bounds. To prevent any lateral displacement I preferably bond said bounding walls to the plate 1 by wax or other material. Said bonding material 9 also serves to seal the undersurface of said bounding walls with the upper surface of the plate 1 to prevent any liquid to leak past and under said bounding members.

I have discovered that if a liquid synthetic resin of the liquid casting type is applied directly upon the surface of said wax bed without any intermediate preparation, it will entrap air bubbles which seemingly adhere to the upper or exposed surface of the wax bed and cannot easily be removed. Many of these air bubbles are minute and if permitted to remain they will produce similar sized voids in the plastic printing plate which will appear as imperfections in the printing surface of the latter.

I deem it essential, therefore, to flood the upper or exposed surface of said wax engraving with some wetting agent such as acetone. I cite acetone only as an illustration of this type of material. It is essential, however, that said flooding agent be one which does not affect the wax and it must be one that decreases the surface tension of the abutting surfaces of the wax and the plastic material so that they more easily wet each other. Gasoline or alcohol would be desirable materials except that they dissolve wax to a greater or lesser degree and thus if they were used as the wetting agents they would disturb or destroy the detail of the impressions in the wax. Acetone leaves little residual material when it vaporizes and has only a slight or negligible softening effect upon the wax.

Figure 3:
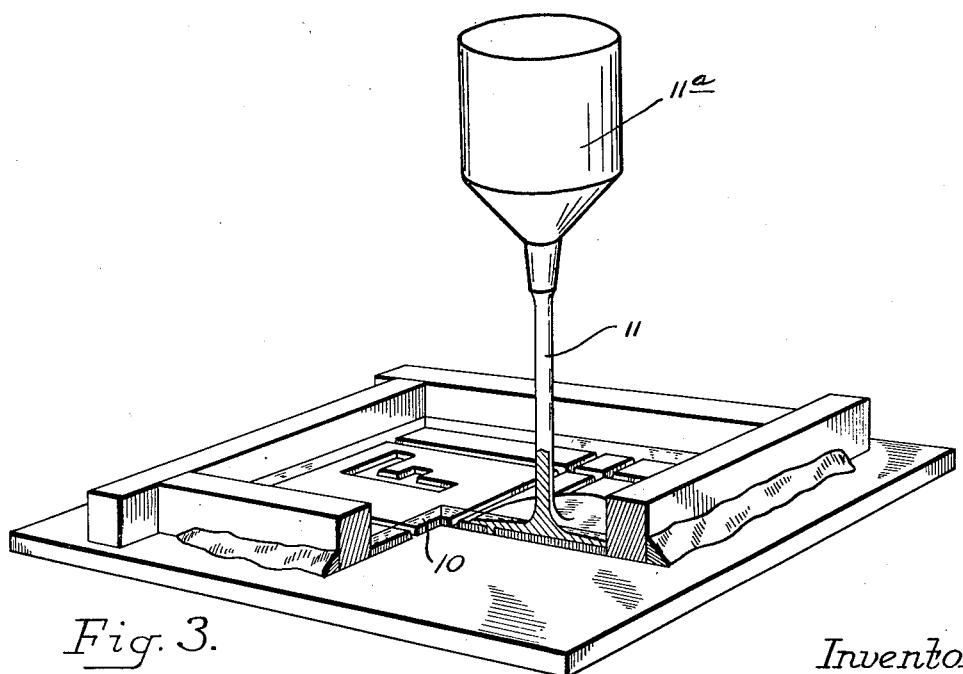
Fig. 3 is a similar diagrammatic illustration of the next succeeding step in which a synthetic resin in the form of a viscous liquid is poured over the surface of said wax engraving, under a wetting agent, and within said bounding members to form a printing plate of more or less uniform thickness but less than the eventual type height of the printing plate.

I then pour a layer of a liquid resin of the liquid casting type over the surface of said mold or wax engraving. A satisfactory synthetic resin is one of the phenol-formaldehyde resins of the liquid casting type. One such casting resin, which I have used satisfactorily, is one sold under the trade-name and style of "Catabond." This is a viscous liquid at room temperatures and is more or less clear. It is sold in sealed containers and will not harden until exposed to air. Even when exposed to air, it does not set or harden at room temperatures and atmospheric pressures unless it is exposed for a substantial period of time. It sets or hardens either in the presence of a catalyst or when subjected to elevated temperatures. I preferably discharge the casting resin from the bottom of a container 11a. This is for the reason that when it is poured from one container to another, it tends to entrain small air bubbles. If said material is permitted to stand in such container 11a for a period of time, the bottom portion tends to be devoid of said particles and thus when poured from a spout or aperture in the bottom the streaming liquid has few entrapped air bubbles. I pour said material through the flooding agent and it is displaced because of its greater specific gravity, in the manner illustrated in Fig. 3. Said material is sufficiently fluid that it forms as a layer of more or less uniform thickness over the flat wax impression mold. It is essential that said plate 1 be arranged more or less horizontally so that the layer of resin be of uniform thickness. The wetting agent 10 is quite readily vaporized at room temperatures and after the casting resin is flowed thereunder it evaporates.

The evaporation of said flooding liquid and the setting of the casting liquid is accelerated by placing the mold thus formed in an oven. In Fig.

4 the heating elements 12 of such an oven are illustrated. Because of the fact that the wax impression will melt or deteriorate at temperatures in the neighborhood of 160° F. it is essential that the elevated temperatures be maintained in the neighborhood of 120° F. to 140° F. The temperatures below 120° F. require the casting liquid to stand for extended periods of time before it sets and temperatures above 140° F. approach the point where the wax engraving would tend to flow and thus lose its detail. The temperatures mentioned are not critical but they do affect the rate at which the casting liquid sets up and the destruction of the wax impression, respectively. I have determined that a synthetic resin of this liquid casting type will tend to set up in about two hours and a half at temperatures around 130° F. After this time interval a skin tends to form over the casting liquid. That is, the temperatures in the oven produced by the heating element 12 tend to cause the resin to harden first at its surface, in the manner ice forms upon water, to produce such skin.

Said layer of resin 11 does not set in a plane but tends to form curved margins 13 or 14 adjacent the inner surface of the bounding members 5, 6, 7 and 8. This may be produced from the tendency of said material to "creep" up the inner faces of the bounding walls by capillary action or otherwise or it may be due to the fact that said material bonds or adheres to said inner walls and tends to reduce somewhat in volume. In any event, said casting material 11 is adhesively secured to the inner surface of said bounding walls and there are no observable cracks or fissures there which would indicate lateral shrinkage of the layer of casting material 11.

It is essential that casting resins of this character shall have little or no shrinkage and the manufacturer of the particular casting resin named specifies that shrinkage is maintained within limits of .002 to .008 inch per inch of material. Even this degree of shrinkage would be undesirable in forming a printing plate if it occurred on the surface exposed to the wax so as to be the printing surface of the plate to be formed. I have established by repeated experiments that said viscous casting liquid forms the fillet 13 or 14 adjacent the bounding members and said material is bonded thereto. Thus, any shrinkage is in thickness of material rather than in the lateral dimensions thereof. This produces a saucerlike back on the layer of material, as is illustrated in cutaway section in Fig. 4.

Said casting liquid is relatively expensive and thus it is desirable for economic reasons to use as small a quantity thereof as necessary. It is essential, however, that "type height" be maintained. Said bounding walls 5, 6, 7, and 8 are preferably made of "type height" and the remainder of said printing element is formed of a material such as plaster of Paris. This is poured over the saucerlike back of resin when said skin effect is formed and thus there is no intermixture of the base material 15 with the synthetic casting resin. I mention plaster of Paris because it is cheap and it bonds securely to the resin and is sufficiently soft that it may be routed or otherwise surfaced by some cutting or polishing tool. It is not essential that said bounding members 5, 6, 7, and 8 be of "type height." They may be slightly of greater height, as is shown in Fig. 5. I deem it preferable however because then the plaster base may be smoothed off roughly by the use of a straight edge which may be drawn over the upper or exposed surfaces of said bounding members.

The use of a plastic or cast base material is not essential although I believe it to be desirable. If desired, such base may be formed of wood or any other sheet of similar characteristics. I believe that a plastic or cast base is preferable because it is then unnecessary to smooth off or fit the saucerlike back of the plastic material to the base. That is, as is shown in Figs. 5 and 6, said base fills in the margins of said rim and said rim tends to extend upwardly and bound to a degree greater than its average depth, the base material, so as mechanically to inhibit the lateral displacement of the base with respect to the hard resin plate formed of the casting resin. If a plastic or cast base is provided it usually is necessary to finish the laminated unit to predetermined overall height. This may be done easily by passing it laterally under a grinding or cutting tool which surfaces the undersurface of the unit. Plaster of Paris or similar material is easily worked or surfaced.

When said printing element is formed as is shown in Fig. 6 the upper or exposed surface is made of a hard resin which is quite highly resistant to scratching or wear. It exhibits little tendency to check or crack. It has the characteristic that it hardens somewhat in proportion to the temperature at which it is cured or set. Said printing element thus carries letters or numerals or other characters 16 and lines 17 of a more or less permanent character upon the upper surface 18 thereof.

Although I have described my invention in connection with a phenol-formaldehyde resin of the liquid casting type I do not wish it to be deemed limited thereto. My method is susceptible of being used with any liquid casting resin of similar specific gravity, tensile strength, compressive strength and similar resistance to physical change or deterioration.

I claim:

1. The method of making printing plates directly from an impression mold constructed of wax-like material comprising, providing said impression mold upon a plane base, flooding the exposed face of said mold with a liquid wetting agent inert to said mold for wetting said mold and removing air bubbles collected thereon, applying over said mold a layer of liquid casting resin characterized by becoming set at temperatures below the melting point of said mold at atmospheric pressure and having greater specific gravity than said wetting agent thereby to displace the latter and fill the impressions of said mold, and subjecting said resin to elevated temperatures below the melting point of said mold for a time sufficient to set said resin.

2. The method of making printing plates directly from an impression mold constructed of wax-like material comprising, providing said impression mold, flooding the exposed face of said mold with a liquid wetting agent inert to said mold for wetting said mold and removing air bubbles collected thereon, applying over said mold a layer of synthetic resin characterized by being fluid at ordinary temperatures and becoming set at temperatures below the melting point of said mold at atmospheric pressure and having greater specific gravity than said wetting agent thereby to displace the latter and fill the impressions of said mold, and subjecting said resin to temperatures substantially above room temperatures but below the melting point of said mold for a time sufficient to set said resin.

3. The method of making printing plates directly from a wax impression mold, comprising providing said impression mold, flooding the exposed face of said mold with a liquid wetting agent inert to said mold for wetting said mold and removing air bubbles collected thereon, applying over said mold a layer of synthetic resin characterized by being fluid and becoming set at temperatures below the melting point of said mold at atmospheric pressure and having greater specific gravity than said wetting agent thereby to displace the latter and fill the impressions of said mold, and subjecting said resin to elevated temperatures below the melting point of said mold for a time sufficient to set said resin.

4. The method of making printing plates directly from an impression mold constructed of wax-like material comprising, providing said impression mold, bounding said mold by walls, flooding the exposed face of said mold with a liquid wetting agent inert to said mold for wetting said mold and removing air bubbles collected thereon, applying over said mold a predetermined thickness of synthetic resin characterized by being fluid at ordinary temperatures and becoming set at temperatures below the melting point of said mold at atmospheric pressure and having greater specific gravity than said wetting agent thereby to displace the latter and fill the impression of said mold, and subjecting said resin to temperatures substantially above room temperatures and below the melting point of said mold for a time sufficient to set said resin and form a printing plate of predetermined height.

5. The method of making printing plates directly from an impression mold constructed of wax-like material comprising, providing said impression mold upon a plane base, bounding said mold by untreated walls having an affinity for a liquid casting resin, flooding the exposed face of said mold with a liquid wetting agent inert to said mold for wetting said mold and removing air bubbles collected thereon, applying over said mold a predetermined thickness of liquid casting resin characterized by becoming set at temperatures below the melting point of said mold at atmospheric pressure and having greater specific gravity than said wetting agent thereby to displace the latter and fill the impression of said mold, promoting shrinkage through the depth of said resin by retaining said resin in intimate contact with said bounding walls a time sufficient to bond said resin to said bounding walls to inhibit lateral shrinkage of said resin, subjecting said resin to elevated temperatures below the melting point of said mold for a time sufficient to set said resin and form a printing plate of predetermined height.

6. The method of making printing plates directly from a wax impression mold comprising, providing said impression mold, bounding said mold by untreated walls having an affinity for liquid phenolformaldehyde resin, flooding the exposed face of said mold with acetone for wetting said mold and removing air bubbles collected thereon, applying over said mold a layer of liquid phenolformaldehyde resin characterized by becoming set at temperatures below the melting point of said mold at atmospheric pressure, said resin thereby displacing the acetone and filling the impressions of said mold, promoting shrinkage through the depth of said resin by retaining said resin in intimate contact with said bounding walls a time sufficient to bond said resin to said bounding walls to inhibit lateral shrinkage of said resin, and subjecting said resin to elevated temperatures below the melting point of said mold to set said resin and form a printing plate of predetermined height.

7. The method of making printing plates directly from an impression mold constructed of wax-like material comprising, providing said impression mold upon a plane base, flooding the exposed face of said mold with a liquid wetting agent inert to said mold for wetting said mold and removing air bubbles collected thereon, applying over said mold a layer of liquid casting resin characterized by becoming set at temperatures below the melting point of said mold at atmospheric pressure and having greater specific gravity than said wetting agent thereby to displace the latter and fill the impression of said mold, subjecting said resin to elevated temperatures below the melting point of said mold for a time sufficient to set said resin, and applying over said resin a predetermined thickness of base material to form a printing plate of predetermined height.

8. The method of making printing plates directly from an impression mold constructed of wax-like material comprising, providing said impression mold upon a plane base, bounding said mold by walls, flooding the exposed face of said mold with a liquid wetting agent inert to said mold for wetting said mold and removing air bubbles collected thereon, applying over said mold a layer of liquid casting resin characterized by becoming set at temperatures below the melting point of said mold at atmospheric pressure and having greater specific gravity than said wetting agent thereby to displace the latter and fill the impressions of said mold, subjecting said resin to elevated temperatures below the melting point of said mold for a time sufficient partially to set said resin, and applying over said resin a predetermined thickness of base material of plaster of Paris to form a laminated printing plate of predetermined height.

BRUCE WELLS.

REFERENCES CITED

The following references are of record in the file of this patent:

UNITED STATES PATENTS

| Number | Name | Date |
| --- | --- | --- |
| 399,264 | Herrington | Mar. 12, 1889 |
| 783,420 | Capps et al. | Feb. 28, 1905 |
| 1,078,265 | Edison | Nov. 11, 1913 |
| 1,123,552 | Knight | Jan. 5, 1915 |
| 1,270,969 | Parker | July 2, 1918 |
| 1,502,343 | Macpherson | July 22, 1924 |
| 1,753,932 | Lobke | Apr. 8, 1930 |
| 1,896,123 | Schweitzer | Feb. 7, 1933 |
| 1,902,627 | Elbogen | Mar. 21, 1933 |
| 1,909,786 | Pantke | May 16, 1933 |
| 1,933,907 | Hickok | Nov. 7, 1933 |
| 1,991,009 | Browne et al. | Feb. 12, 1935 |
| 2,022,183 | Browne | Nov. 26, 1935 |
| 2,063,315 | Kuettel | Dec. 8, 1936 |
| 2,071,907 | Tattersall | Feb. 23, 1937 |
| 2,136,422 | Fields | Nov. 15, 1938 |
| 2,250,958 | Kautter et al. | July 29, 1941 |
| 2,303,339 | Dreyfus | Dec. 1, 1942 |
| 2,314,378 | Van Rossem | Mar. 23, 1943 |
| 2,480,048 | Rice | Aug. 23, 1949 |

OTHER REFERENCES

"The Chemistry of Synthetic Resins" by Carleton Ellis, volume II, published by Reinhold Publishing Corp., page 1313. (Copy in U. S. Patent Office Scientific Library.)